Patented Oct. 18, 1927.

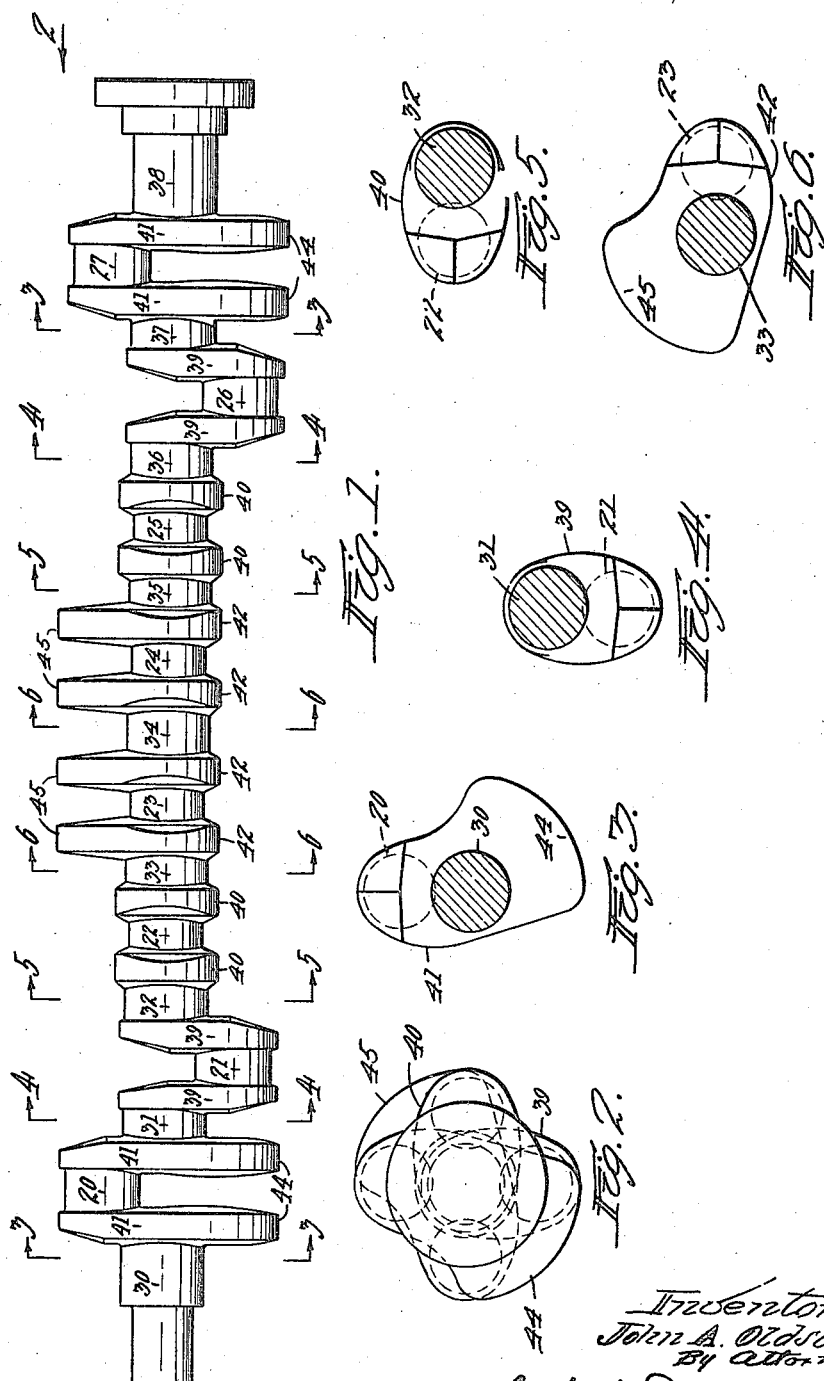

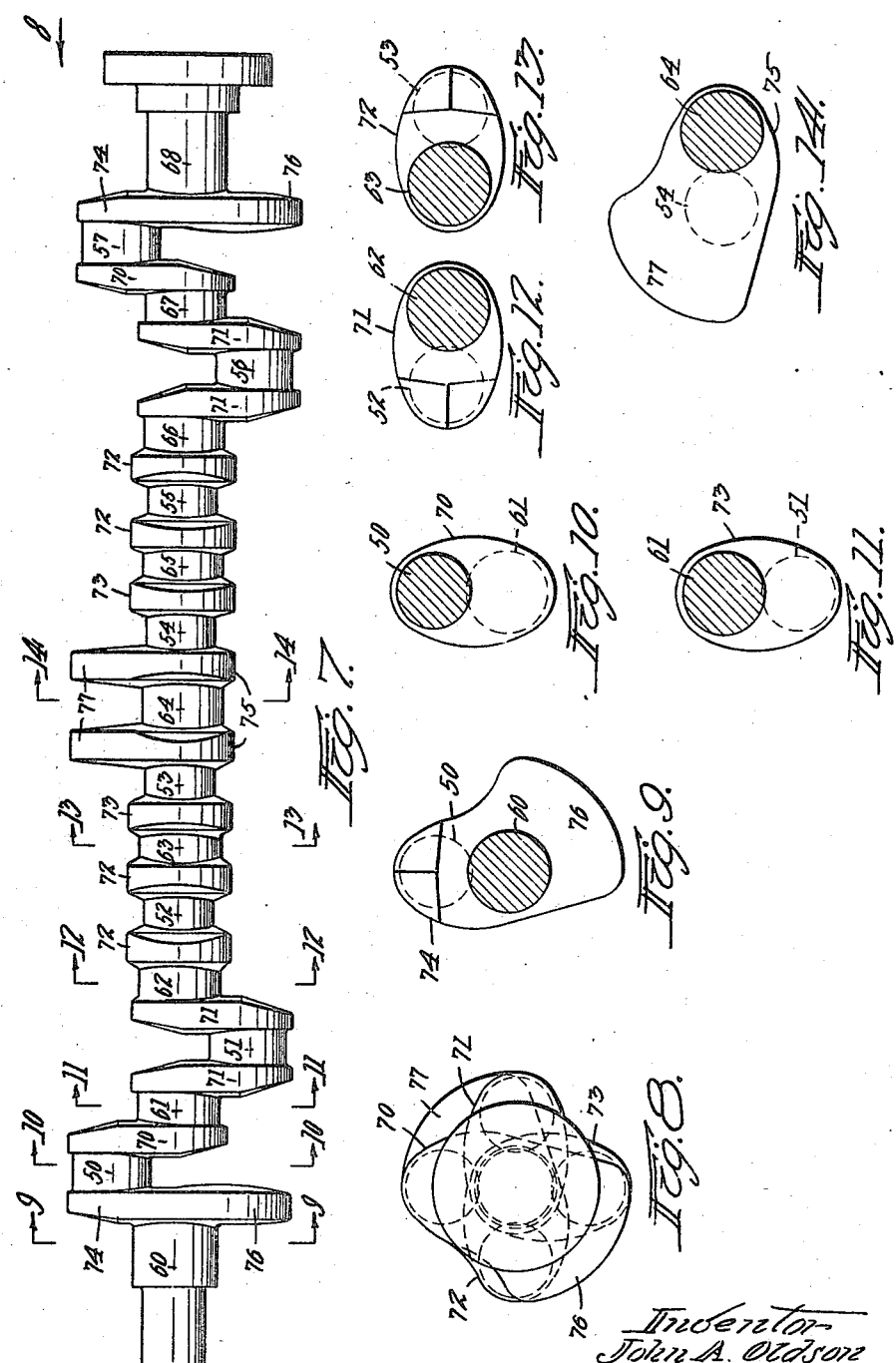

1,645,718

UNITED STATES PATENT OFFICE.

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS.

BALANCED CRANK SHAFT.

Application filed May 16, 1927. Serial No. 191,617.

This invention relates to a crankshaft particularly designed for use in high speed automobile engines. More specifically my invention relates to a crankshaft of the eight-throw, nine-bearing type in which the crankpins are disposed in two planes positioned at 90° to each other.

It is the general object of my invention to provide a construction in such crankshafts by which the shaft is counter-balanced, both statically and dynamically, by providing integral forged counterweights associated with the two end crankpins which lie in one plane and with the two center crankpins which lie in a plane at 90° thereto. These counterweights are so designed as to maintain the static balance of the shaft and also to offset the dynamic couple produced by the successive application of power in the different cranks in the operation of the engine.

To accomplish this purpose, each counterweight is offset laterally in a direction opposed to that of the next adjacent crankpin in the alternate plane.

My invention further relates to arrangements and combinations of parts which will be hereinafter described and more particularly pointed out in the appended claims.

A preferred form and a modification of the invention are shown in the drawings in which Fig. 1 is a front elevation of an eight-throw, nine-bearing crankshaft embodying my improvements;

Fig. 2 is an end elevation thereof, looking in the direction of the arrow 2 in Fig. 1;

Figs. 3, 4, 5 and 6 are sectional end elevations, taken along the lines 3—3, 4—4, 5—5 and 6—6 respectively in Fig. 1;

Fig. 7 is a front elevation of an eight-throw, nine-bearing crankshaft, showing a modified construction;

Fig. 8 is an end elevation, looking in the direction of the arrow 8 in Fig. 7; and Figs. 9 to 14 inclusive are sectional end elevations, taken on the lines 9—9, 10—10, 11—11, 12—12, 13—13 and 14—14 respectively in Fig. 7.

Referring particularly to Figs. 1 to 6, I have shown a crankshaft having eight crankpins numbered 20 to 27 inclusive and having nine shaft bearings numbered 30 to 38 inclusive. The crankpins 20, 21, 26 and 27 lie in a single plane, and the crankpins 22, 23, 24 and 25 lie in an alternate plane disposed at 90° to the first plane.

The crankpins 21 and 26 are at 180° from the crankpins 20 and 27, and the crankpins 23 and 24 are at 180° from the crankpins 22 and 25. The crankpins 22 and 25 are behind the axis of the shaft, as viewed in Fig. 1, while the crankpins 23 and 24 are in front of the axis of the shaft. Each crankpin is connected to its adjacent shaft bearings by cheeks at each end of each crankpin.

The crankpins 21, 22, 25 and 26 are connected to their shaft bearings by short straight cheeks, as indicated at 39 in Fig. 4 or 40 in Fig. 5. The remaining crankpins 20, 23, 24 and 27 are connected to their shaft bearings by cheeks, such as 41 in Fig. 3 or 42 in Fig. 6, which are extended beyond the associated shaft bearings and which are enlarged laterally on one side to provide counterweights 44 and 45 (Figs. 3 and 6). The center of mass of the counterweight 44 is offset at an angle of approximately 45° from the line joining the centers of the associated crankpin and shaft bearing and is offset in a direction opposite to the position of the nearest crankpin in the alternate plane. That is, the counterweights 44 in Fig. 1 project forward from the plane of the crankpins 20 and 21 and the crank 22 projects rearward from said plane.

Similarly the counterweights 45 project upwardly from the plane to the crankpins 22 and 23, as viewed in Fig. 1, while the nearest crankpin in the alternate plane, namely the crankpin 21, projects downward. I thus provide counterweights on the cheeks of the two end crankpins in one plane and on the cheeks of the two center crankpins in the alternate plane, and by offsetting the counterweights as above described, I produce a shaft which is in static balance, as the counterweights are at 180° from each other, and I also produce a shaft which is well balanced dynamically at all reasonable speeds, such as are encountered in actual operation.

The counterweights disposed as above described substantially eliminate the tendency of the shaft to whip or bow outward between the end bearings 30 and 38, there being a marked tendency in such shafts when not counterweighted to assume an outward curvature between the bearings 30 and 38 the amount of curvature varying with the speed.

In Figs. 7 to 14 I have shown a modified construction in which a less number of counterweights is provided. Referring to Fig. 7, I have provided an eight-throw, nine bearing shaft having eight crankpins numbered 50 to 57 inclusive and nine shaft bearings numbered 60 to 68 inclusive. Each crankpin is connected to its adjacent crank bearing by two cheeks which with four exceptions are of the short and simple form indicated at 70 (Fig. 10), 71 (Fig. 11) 72 (Fig. 12) or 75 (Fig. 13). The remaining cheeks are of the type shown at 74 (Fig. 9) or 75 (Fig. 14).

It will be noted that the crankpins 50 and 51 are positioned 180° apart in a single plane and that the crankpins 52 and 53 are similarly positioned 180° apart in an alternate plane perpendicular to the plane of the pins 50 and 51. As viewed in Fig. 7, the crankpins 52 and 55 are back of the axis of the crankshaft and the crankpins 53 and 54 are forward of the axis.

The end cheeks 74 are extended beyond the axis of the shaft bearing and are enlarged laterally as indicated at 76 in Fig. 9, the center of the counterweight being on a line substantially at 45° from the line joining the center of the associated crankpin and crank bearing. The counterweights are offset in a direction opposite to the position of the nearest crankpin in the alternate plane, as in the preferred form. That is, the counterweights 76 project forwardly while the crankpins 52 and 55 project rearwardly as viewed in Fig. 7.

Similarly the center cheeks 75 are provided with counterweights 77 similarly offset at an angle of approximately 45° and in a similar direction. That is, the counterweights 77 are projected upwardly, as viewed in Fig. 7, while the nearest crankpins 52 and 55 in the alternate plane project downwardly.

The operation and advantages of this construction are similar to that of the preferred form, when sufficient width can be obtained for the heavier counterweights 76 and 77. In many crankshafts, however, the axial distance between bearings is reduced to a minimum, so that it is difficult to get a sufficient weight of metal in a single counterweight between a crankpin and one of its shaft bearings, and in such cases it is desirable to use the counterweights in pairs instead of singly, as shown in Fig. 1.

A crank-shaft constructed as above described, either with the double counterweights shown in Figs. 1 to 6 or with the single counterweights shown in Figs. 7 to 14, has been found very satisfactory in use, greatly reducing the vibration of the shaft when in rapid rotation, and correspondingly increasing the smoothness of the running of the engine.

Having thus described my invention and the advantages thereof I do not wish to be limited to the details herein disclosed otherwise than as set forth in the claims, but what I claim is:—

1. An eight-throw nine-bearing crankshaft having crankpins disposed in two planes positioned perpendicular to each other, said crankpins being positioned on opposite sides of the axis in each plane, and said crankshaft having counterweights forged integral with said shaft and associated with the two end crankpins and with the two middle crankpins only, the center of mass of each counterweight being offset at an angle of substantially 45° from its associated crank cheek and away from the nearest crankpin in the plane perpendicular to said cheek, the end and center counterweights being spaced diametrically apart.

2. An eight-throw nine-bearing crankshaft having crankpins disposed in two planes positioned perpendicular to each other, said crankpins being positioned on opposite sides of the axis in each plane, and said crankshaft having counterweights forged integral with said shaft and associated in pairs with the two end crankpins and with the two middle crankpins only, the center of mass of each counterweight being offset at an angle of substantially 45° from its associated crank cheek and away from the nearest crankpin in the plane perpendicular to said cheek, the end and center counterweights being spaced diametrically apart.

In testimony whereof I have hereunto affixed my signature.

JOHN A. OLDSON.